(12) United States Patent
Mänttäri et al.

(10) Patent No.: US 8,220,004 B2
(45) Date of Patent: Jul. 10, 2012

(54) METHOD, APPARATUS AND COMPUTER PROGRAM PRODUCT FOR SHARING RESOURCES VIA AN INTERPROCESS COMMUNICATION

(75) Inventors: Tommi Olavi Mänttäri, Ii (FI); Miikka Petteri Kirveskoski, Oulu (FI)

(73) Assignee: Nokia Corporation, Espoo (FI)

( * ) Notice: Subject to any disclaimer, the term of this patent is extended or adjusted under 35 U.S.C. 154(b) by 621 days.

(21) Appl. No.: 12/425,630

(22) Filed: Apr. 17, 2009

(65) Prior Publication Data
US 2010/0269120 A1    Oct. 21, 2010

(51) Int. Cl.
*G06F 13/00* (2006.01)
(52) U.S. Cl. ........ 719/312; 719/313; 718/100; 718/102; 718/104; 718/107
(58) Field of Classification Search ................ 719/312, 719/313; 718/100, 102, 104, 107
See application file for complete search history.

(56) References Cited

U.S. PATENT DOCUMENTS

| | | | | |
|---|---|---|---|---|
| 6,412,034 | B1 * | 6/2002 | Chan ............................ | 710/200 |
| 7,640,315 | B1 * | 12/2009 | Meyer et al. ................... | 709/210 |
| 7,792,916 | B2 * | 9/2010 | Dowedeit ....................... | 709/214 |
| 2001/0014918 | A1 * | 8/2001 | Harter et al. .................. | 709/313 |
| 2004/0025166 | A1 | 2/2004 | Adlung et al. | |
| 2010/0083268 | A1 * | 4/2010 | Morris ........................... | 718/104 |
| 2010/0121927 | A1 * | 5/2010 | Zhang et al. ................... | 709/206 |

FOREIGN PATENT DOCUMENTS

| EP | 0 884 679 A1 | 12/1998 |
|---|---|---|
| GB | 2 411 253 A | 8/2005 |
| GB | 2 420 642 A | 5/2006 |

OTHER PUBLICATIONS

International Search Report and Written Opinion of corresponding international application No. PCT/IB2010/000857 mailed Aug. 27, 2010.
"Fun with SCM_RIGHTS", Oct. 6, 2007.

* cited by examiner

*Primary Examiner* — Andy Ho
(74) *Attorney, Agent, or Firm* — Alston & Bird LLP

(57) ABSTRACT

An apparatus for sharing resources between interconnected processes via an interprocess communication may include a processor and a memory storing executable instructions that in response to execution by the processor cause the apparatus to at least perform operations including receiving a request from at least one first process that controls one or more resources. The request may include data requesting assignment of one or more rights to share at least one of the resources with at least a second process. The instructions may further cause the apparatus to assign the rights to share the resource with the second process and remove the rights to share the resource from the second process upon receipt of a first message. Corresponding computer program products and methods are also provided.

20 Claims, 5 Drawing Sheets

METHOD, APPARATUS AND COMPUTER PROGRAM PRODUCT FOR SHARING RESOURCES VIA AN INTERPROCESS COMMUNICATION

TECHNOLOGICAL FIELD

Embodiments of the present invention relate generally to interprocess communication and, more particularly, relate to a method, apparatus and computer program product for sharing resources between one or more processes via an interprocess communication in a secure and flexible manner.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer and convenience to users relates to sharing of resources between different processes (e.g., an instance of a computer program). These processes may be interconnected with each other and may be executed on a single electronic device or may be executed on multiple electronic devices. One example of a benefit of sharing resources between processes is that such sharing permits simultaneous execution of one or more instructions from different processes which fosters efficient use of resources in electronic devices. Another example of a benefit of sharing resources between interconnected processes is that it allows different processes to share the same set of instructions in memory in order to conserve storage space in electronic devices.

Existing solutions relating to the sharing of resources between processes typically consist of providing file descriptors to processes. In this regard, the file descriptors may serve as keys for accessing resources to be shared such as a file, directory, memory, etc. via an interprocess communication. However, existing solutions relating to the sharing of resources between processes suffer from a drawback of being very inflexible. For example, a UNIX domain socket may be used to send data between one or more processes and these processes can send file descriptors to each other, for sharing resources, across a UNIX domain socket connection using sendmsg( ) and recvmsg( ) system calls with Software Configuration Management (SCM) rights. However, existing solutions such as the UNIX domain socket using the sendmsg( ) and recvmsg( ) functions with SCM rights do not typically provide any mechanism to terminate the usage of a resource after the interprocess communication has ended. Also, there is no suitable mechanism to limit the passing of a resource from one process to another process once the resource is shared. As such, there is currently no suitable mechanism for limiting how long these resources can be shared between processes. In other words, when access to these resources is granted, the access is typically granted indefinitely and there is no suitable mechanism to remove the access rights to a shared resource once they are granted to a process and this is typically the case even when a connection between the processes is removed.

Another drawback of using the existing solutions to granting access for shared resources is that these solutions are tightly coupled or tied to a specific protocol and application programming interface (API) such as the UNIX domain socket using the sendmsg( ) and recvmsg( ) function calls with the SCM rights. Usage of this specific protocol and API forces all communication with respect to the interconnected processes to be rewritten to conform to this specific protocol and API, which is oftentimes not desirable and may result in an inefficient use of resources. In this regard, the existing solutions may force an application to use a specific API (e.g., UNIX domain socket) for accessing a shared resource instead of the API that the application or process would normally use for such a resource. For instance, the UNIX API may for example use a special "dup( )" function call to access a shared resource whereas a normal API may use a normal open( ) function to access a resource. When using the UNIX API, the normal open( ) function may need to be rewritten or changed to another function corresponding to the UNIX API such as for example the special "dup( )" function call. Most importantly, since traditional UNIX systems are multiuser devices the usage of access control mechanisms are typically limited to protect processes and resources of different users from each other. In contrast, any mobile device is typically a single user device e.g., a personal device, thus traditional access control mechanisms used in UNIX systems are typically not applicable. Therefore, a new access control mechanism to protect processes and their resources from each other is needed. The importance of this change has increased because of the wide adoption of UNIX standards (e.g. Portable Operating System Interface for Unix (POSIX)) and UNIX based operating systems in mobile devices (e.g. Linux Operating System (OS) and Berkeley Software Distribution (BSD) OS variants).

Accordingly, it may be desirable to provide a different mechanism by which to share resources via an interprocess communication to allow sharing of resources between interconnected processes in a secure and flexible manner.

BRIEF SUMMARY

A method, apparatus and computer program product are therefore provided for sharing resources between interconnected processes of electronic devices in a secure and flexible manner. As referred to herein, a process may relate to an application, one or more instances of a program, software code, software instructions, an algorithm or the like, which is executable by a processor, controller, etc. The exemplary embodiments facilitate granting of access rights for resources of processes which are decoupled from the UNIX API for the interprocess communication protocol which utilizes the sendmsg( ) and recvmsg( ) function calls. Also, the access rights for resources of processes may be removed at any time and any operations (e.g., read and write operations) to already opened resources can be denied when the interprocess communication is terminated.

The exemplary embodiments may link access rights for a resource to an open interprocess communication channel and may provide a secure and flexible manner in which to share resources via an interprocess communication channel. The mechanism of the exemplary embodiments are not specific to and do not require usage of the sendmsg( ) and recvmsg( ) function calls of the UNIX API and in this regard the mechanism of interprocess communication of the exemplary embodiments may be more widely utilized than existing solutions, since the existing solutions typically require all communication between interconnected processes to occur in a specific protocol and API (e.g., UNIX domain sockets) which may require rewriting of code associated with the processes in order to conform to the UNIX protocol and API.

It should be pointed out that an operating system (OS) application programming interface (API) of the exemplary embodiments may ensure that only a single process on the interprocess communication channel can access the resource. Additionally, access rights for a resource can be added to one or more processes or removed from one or more processes at any time. A process that is designated as owning or controlling the resource may specify that a remote peer device pass on the access rights, associated with the resource, to another process. In like manner, a process that owns or controls the resource may prohibit a remote peer device from passing on the access rights to a resource to any other process. Additionally, according to the exemplary embodiments when the interprocess communication channel is closed all access rights may be removed for any resources and any access (e.g., read and/or write access) to already opened resources may be terminated.

In an exemplary embodiment, a method of sharing resources between interconnected processes is provided. The method may include receiving a request from at least one first process that controls one or more resources. The request may include data requesting assignment of one or more rights to share at least one of the resources with at least a second process. The method further may include assigning the rights to share the resource with the second process and removing the rights to share the resource from the second process upon receipt of a first message.

In another exemplary embodiment, a computer program product for sharing resources between interconnected processes is provided. The computer program product includes at least one computer-readable storage medium having computer-executable program code instructions stored therein. The computer-executable program code instructions may include program code instructions for causing receipt of a request from at least one first process that controls one or more resources. The request may include data requesting assignment of one or more rights to share at least one of the resources with at least a second process. The program code instructions may also provide for assigning the rights to share the resource with the second process and for removing the rights to share the resource from the second process upon receipt of a first message.

In another exemplary embodiment, an apparatus for sharing resources between interconnected processes is provided. The apparatus may include a processor and a memory storing executable instructions that in response to execution by the processor cause the apparatus to at least perform operations including receiving a request from at least one first process that controls one or more resources. The request may include data requesting assignment of one or more rights to share at least one of the resources with at least a second process. The instructions may further cause the apparatus to assign the rights to share the resource with the second process and remove the rights to share the resource from the second process upon receipt of a first message.

Embodiments of the invention may provide a method, computer program product and apparatus for sharing resources between each other in a secure and flexible manner. As a result, for example, device users may enjoy an improved capability for obtaining resources via an interprocess communication channel.

BRIEF DESCRIPTION OF THE SEVERAL VIEWS OF THE DRAWINGS

Figure 1:
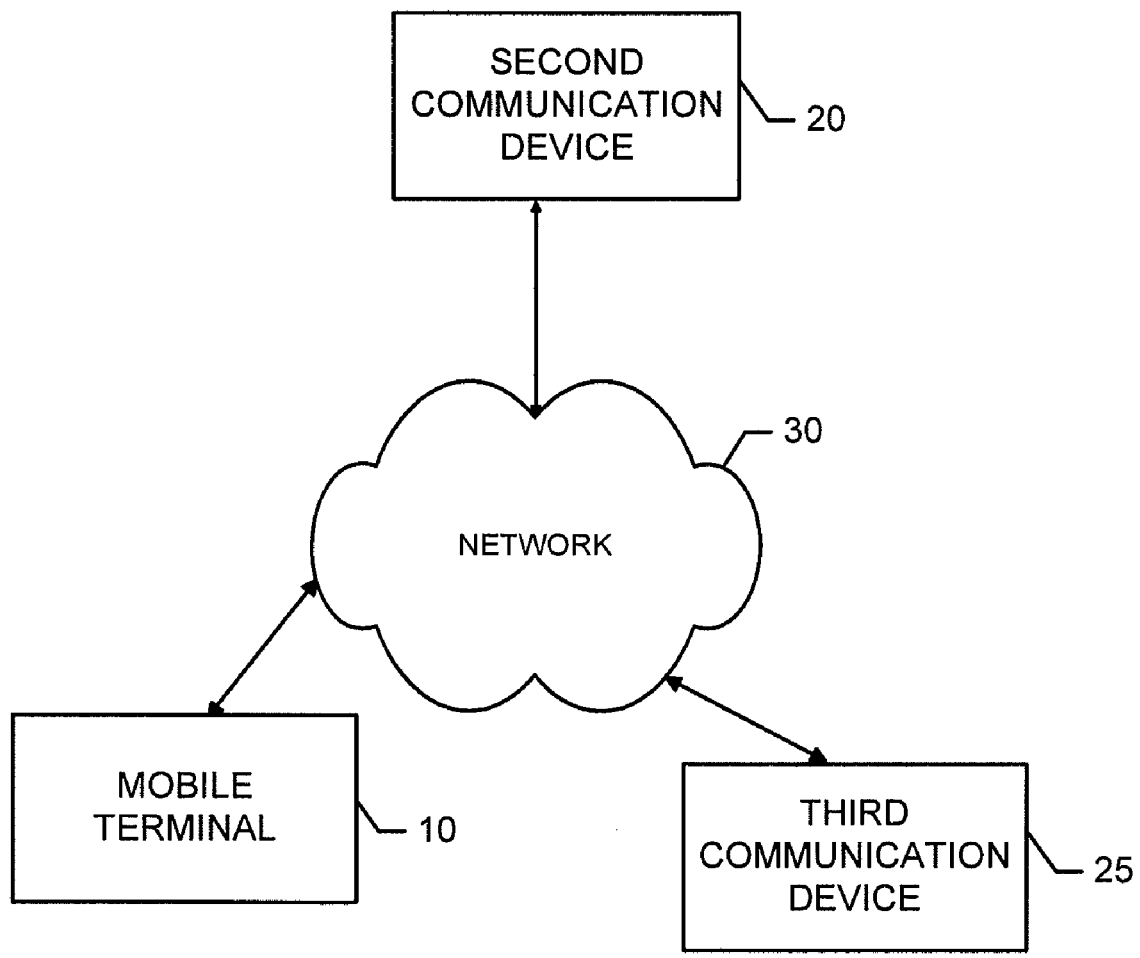
Figure 2:
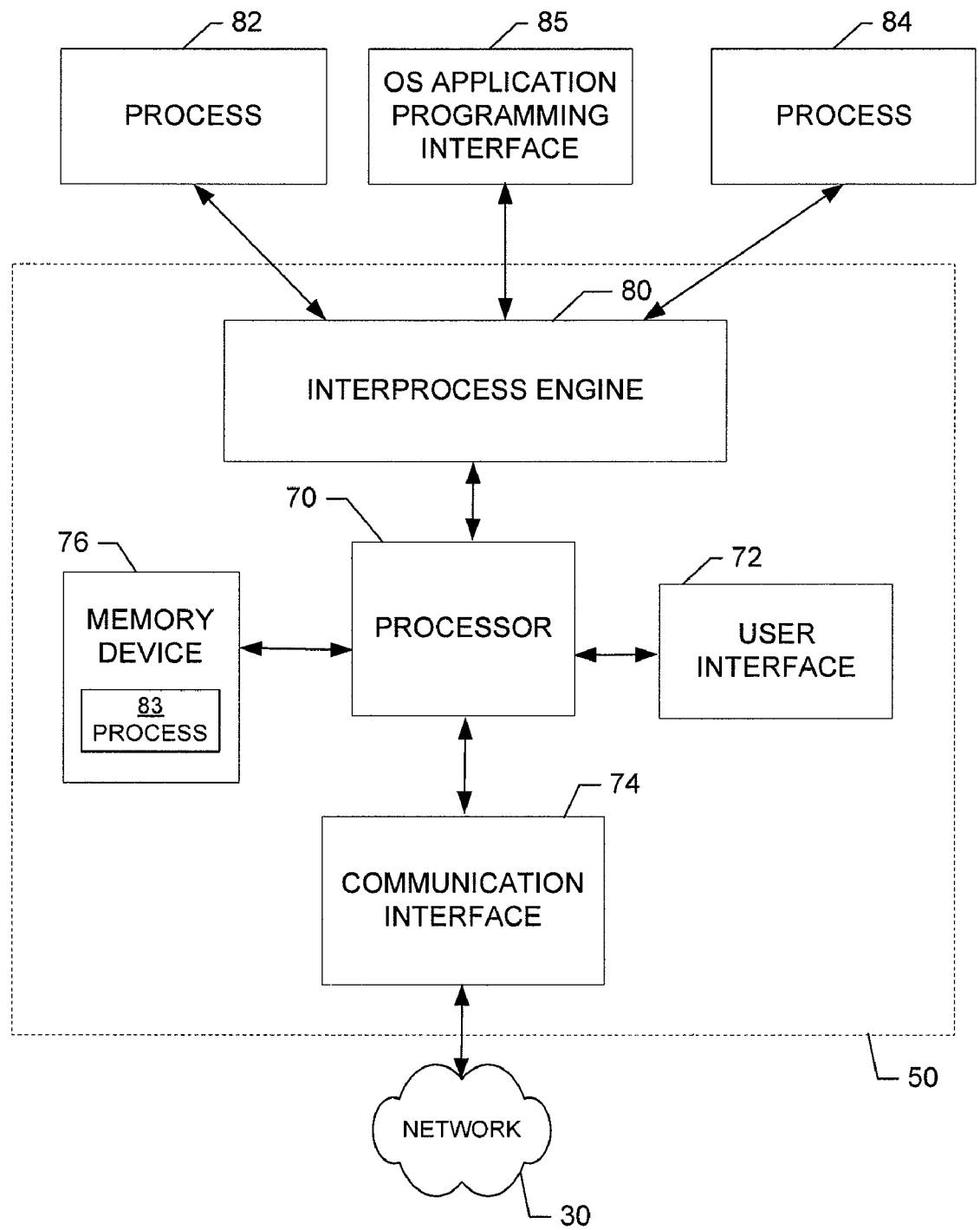
Figure 3:
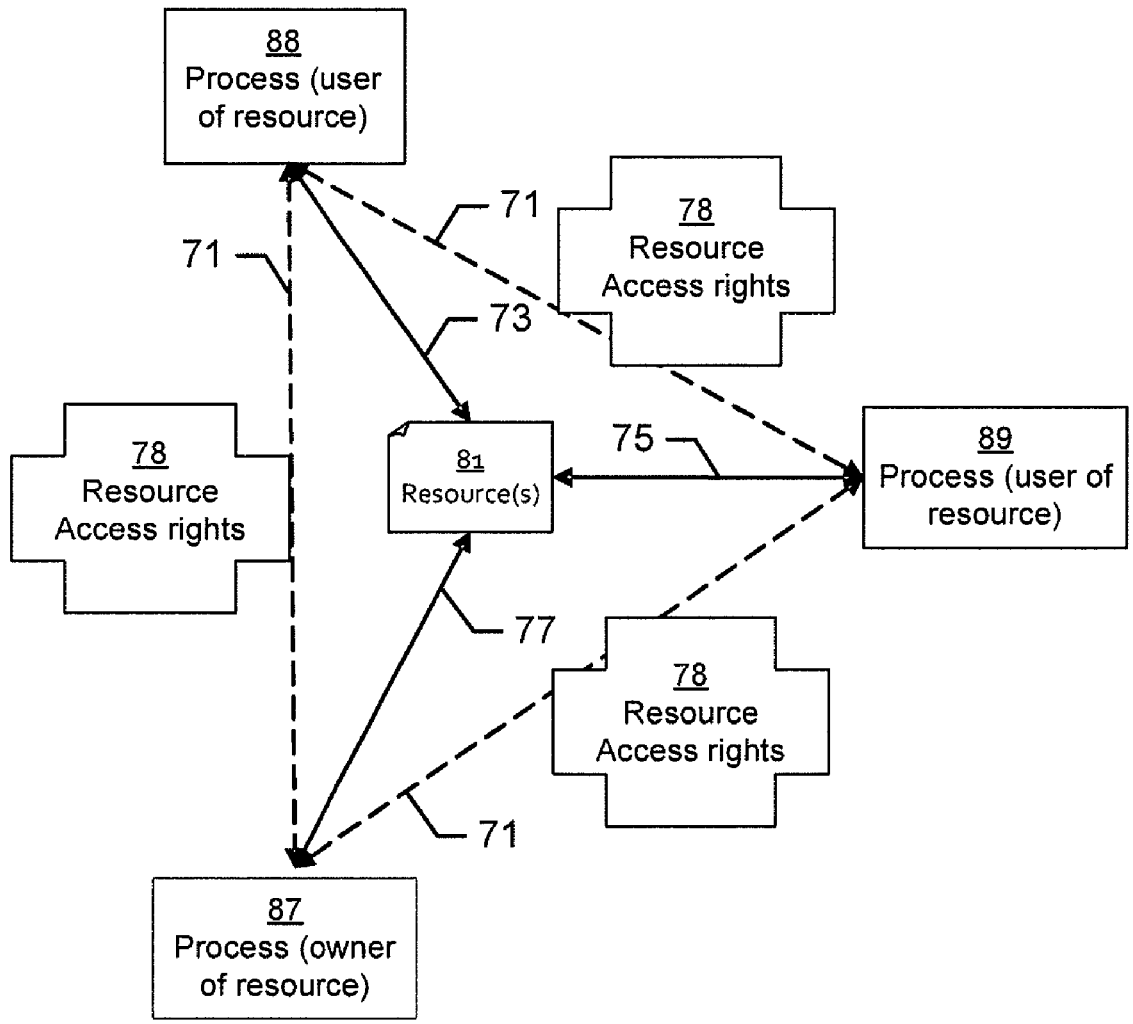
Figure 4:
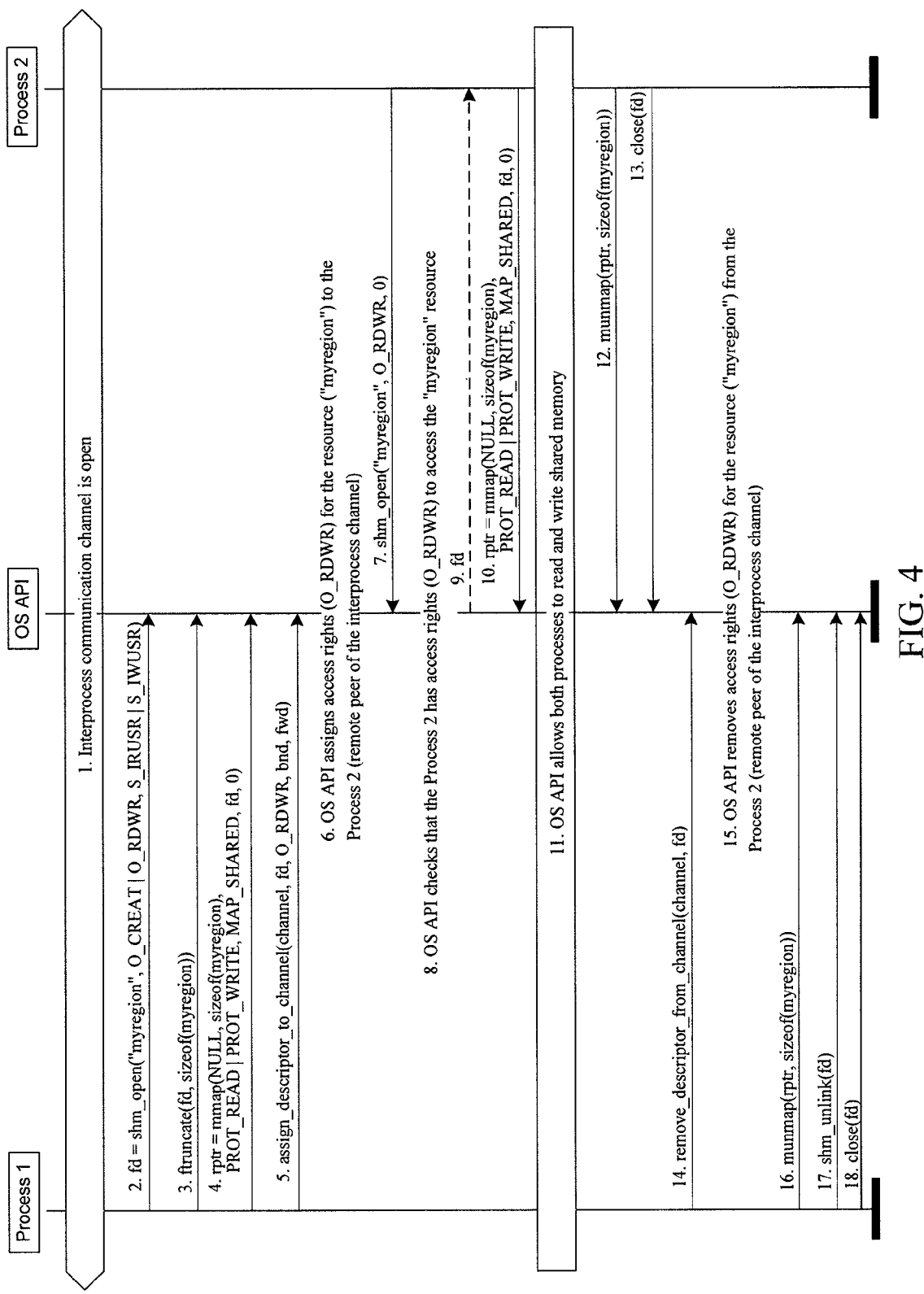
Figure 5:
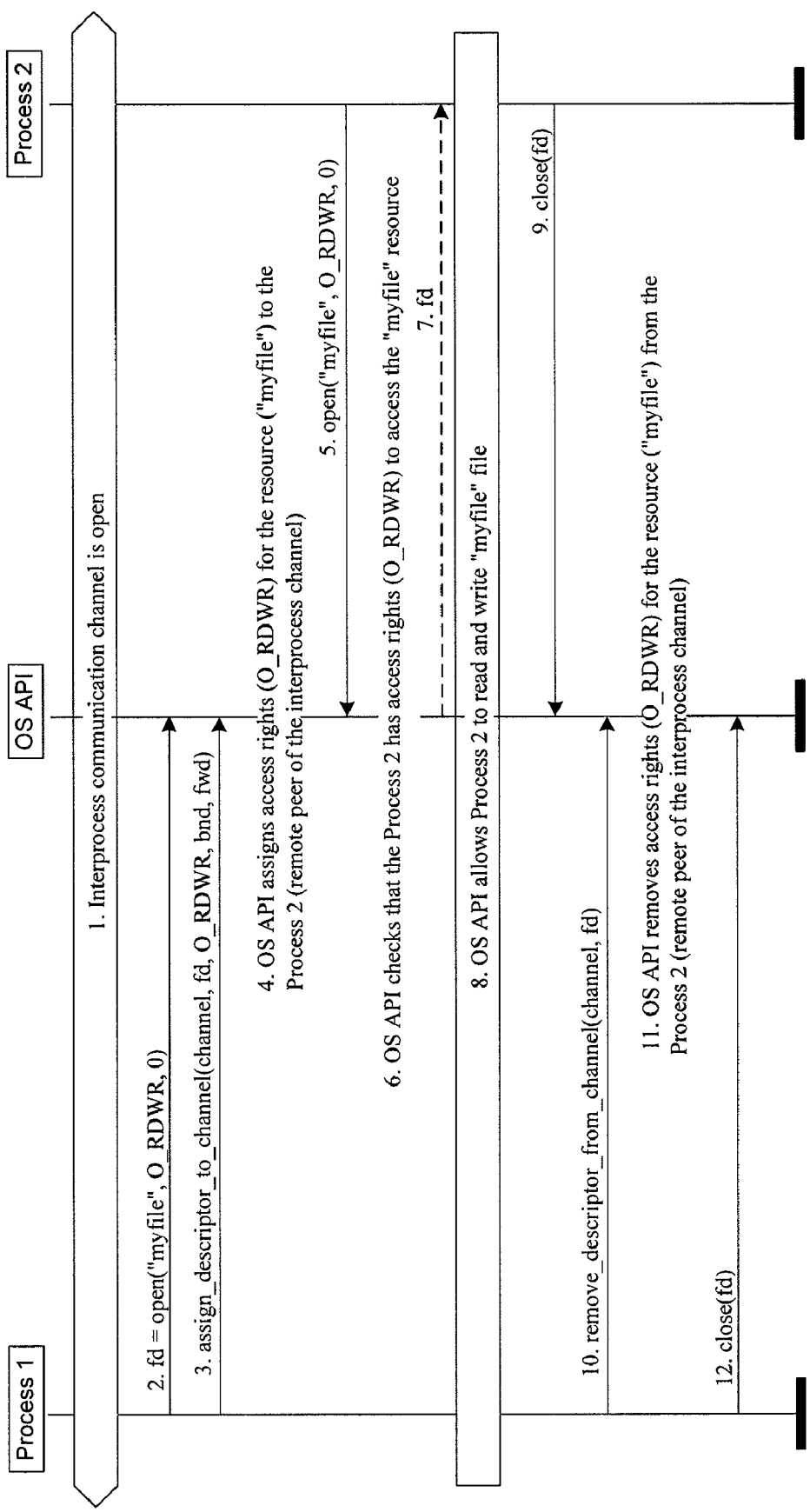

Having thus described the invention in general terms, reference will now be made to the accompanying drawings, which are not necessarily drawn to scale, and wherein:

FIG. 1 illustrates one example of a communication system according to an exemplary embodiment of the invention;

FIG. 2 illustrates a schematic block diagram of an apparatus for sharing resources via an interprocess communication according to an exemplary embodiment of the invention;

FIG. 3 illustrates sharing of access rights to a resource via an interprocess communication according to an exemplary embodiment of the invention;

FIG. 4 is a signal flow diagram relating to a method for sharing memory via an interprocess communication according to an exemplary embodiment of the invention; and FIG. 5 is a signal flow diagram relating to a method for sharing a file(s) via an interprocess communication according to an exemplary embodiment of the invention.

DETAILED DESCRIPTION

Embodiments of the present invention will now be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary," as used herein, is not provided to convey any qualitative assessment, but instead merely to convey an illustration of an example. Thus, use of any such terms should not be taken to limit the spirit and scope of embodiments of the invention.

FIG. 1 illustrates a generic system diagram in which a device such as a mobile terminal 10 is shown in an exemplary communication environment. As shown in FIG. 1, an embodiment of a system in accordance with an example embodiment of the present invention may include a first communication device (e.g., mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ embodiments of the present invention may comprise all the devices illustrated and/or described herein. While several embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In some embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), Bluetooth (BT), Infrared (IR) or any of a number of different wireline or wireless communication techniques, including LAN, Wireless LAN (WLAN), Worldwide Interoperability for Microwave Access (WiMAX), WiFi, Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like. Additionally, it should be pointed out that the mobile terminal 10 and the second and third communication devices 20 and 25 may communicate with each other via one or more communication channels. In this regard, the mobile terminal 10 and the second and third communication devices 20 and 25 may utilize one or more communication channels designated as interprocess communication channels to share resources between one or more processes that may be executed within the mobile terminal 10 and the second and third communication devices 20 and 25 as well as one or more processes that may be external to the mobile terminal 10 and the second and third communication devices 20 and 25.

In example embodiments, the first communication device (e.g., the mobile terminal 10) may be a mobile communication device such as, for example, a personal digital assistant (PDA), wireless telephone, mobile computing device, camera, video recorder, audio/video player, positioning device, game device, television device, radio device, or various other like devices or combinations thereof. The second communication device 20 may be a mobile or fixed communication device. However, in one example, the second communication device 20 may be a remote computer or terminal such as a personal computer (PC) or laptop computer.

In an exemplary embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an exemplary embodiment, one or more of the devices in communication with the network 30 may employ an interprocess engine to assist in facilitating the sharing of resources between one or more interconnected processes (e.g., applications, instances of a program or the like) being executed on the devices (e.g., mobile terminal 10, second and third communication devices 20 and 25). The interprocess engine may facilitate the sharing of resources, such as one or more files, one or more memories or memory objects, one or more directories, and/or one or more sockets and other local resources, between interconnected processes in a secure and flexible manner. As such, for example a process of a device may utilize the interprocess engine to request one or more resources from another device and the process of the device may also utilize the interprocess engine to deny access to one or more resources. In an exemplary embodiment, the mobile terminal 10 and the second and third communication devices 20 and 25 may be configured to include the interprocess engine. As indicated above, in an exemplary embodiment the processes may be local to a particular device and as such the interprocess engine may facilitate the sharing of resources between processes or applications with or without regard to any connection to the network 30 of FIG. 1 and thus FIG. 1 should be understood to provide one example of some devices that may employ an embodiment of the present invention within a typical environment that such devices may often be found.

FIG. 2 illustrates a schematic block diagram of an apparatus for facilitating the sharing of one or more resources between interconnected processes in a secure and flexible manner according to an exemplary embodiment of the invention. An exemplary embodiment of the invention will now be described with reference to FIG. 2, in which certain elements of an apparatus 50 for facilitating the sharing of one or more resources between interconnected processes are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some of the devices or elements may be omitted in certain embodiments.

Referring now to FIG. 2, an apparatus 50 for facilitating the sharing of one or more resources between interconnected processes is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, directories, applications, one or more processes (e.g., process 83), instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may otherwise be a general purpose processing element or other functionally configurable circuitry if not for the specific configuration provided by the instructions, to perform the algorithms and operations described herein. However, in some cases, the processor 70 may be a processor of a specific device (e.g., a mobile terminal) adapted for employing embodiments of the present invention by further configuration of the processor 70 by instructions for performing the algorithms and operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). The communication interface 74 may receive and/or transmit data via one or more communication channels. In this regard, the communication interface 74 may, but need not, pass or provide one or more resources between interconnected processes via a communication channel(s) designated as an interprocess communication channel(s). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

In an exemplary embodiment, the processor 70 may be embodied as, include or otherwise control an interprocess engine 80. The interprocess engine 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the interprocess engine 80 as described below. Thus, in examples in which software is employed, a device or circuitry (e.g., the processor 70 in one example) executing the software forms the structure associated with such means. In this regard, for example, the interprocess engine 80 may be configured to provide, among other things, for the sharing of one or more resources between interconnected processes in a secure and flexible manner.

In some embodiments the interprocess engine 80 may be in communication with one or more processes 82 and 84 (also referred to herein as applications). While the exemplary embodiment of FIG. 2 shows that the interprocess engine 80 may communicate with two processes (i.e., processes 82 and 84), it should be pointed out that the interprocess engine 80 may communicate with any number of processes without departing from the spirit and scope of the invention. For example, as described above the memory device 76 may include one or more processes (e.g., process 83) and the interprocess engine 80 may communicate with the processes of memory device 76 as well as any other processes. The processes 82 and 84 may, but need not be, located external to the apparatus 50 (e.g., mobile terminal 10) and in this regard the processes 82 and 84 may be in communication with the interprocess engine 80 (and/or the processor 70) via the communication interface 74 and more particularly via a communication channel such as, for example, an interprocess communication channel. In an exemplary embodiment, both of the processes 82 and 84 may be located at the second communication device 20 or at the third communication device 25. Alternatively, the process 82 may be located at the second communication device 20 whereas the process 84 may be located at the third communication device 25. However, it should also be pointed out that the process 82 may be located at the third communication device 25 while the process 84 may be located at the second communication device 20.

Moreover, it should be pointed out that the processes of the exemplary embodiments may communicate, via the interprocess engine 80, with an operating system (OS) application programming interface (API) 85 which may coordinate the activities associated with the sharing of resources among one or more processes. The OS API 85 may be embodied in a computer program product as instructions that are stored in the memory of a communication device (e.g., the mobile terminal 10 and/or the second and third communication devices 20 and 25) and executed by the processor 70. Alternatively, the OS API 85 may be embodied as the processor 70 (e.g., as an FPGA, ASIC, or the like). Additionally, the OS API 85 may be any device or circuitry operating in accordance with software or otherwise embodied in hardware or a combination of hardware and software thereby configuring the device of circuitry to perform the corresponding functions of the OS API 85 as described herein. Although the OS API 85 is shown as being located external to the apparatus 50 in FIG. 2, it should be pointed out that the OS API 85 may be located internal to the apparatus 50 without departing from the spirit and scope of the invention.

The OS API 85 may be configured to provide the processes with access to services or data and may pass or provide parameters and access rights to one or more resources between the processes by utilizing system calls. The OS API 85 may receive one or more calls (or call functions) from one or more processes requesting that access rights to one or more resources of a respective process are granted to another process or removed from another process. In this regard, the OS API 85 may assign access rights to one or more resources that may be controlled by one process (e.g., process 83), to another process (e.g., process 82) so that the resource may be shared by these processes. In like manner, the OS API 85 may remove the access rights to one or more resources that were granted to a process. In this regard, the OS API 85 may close a communication channel which facilitated the sharing of one or more resources between processes. When the OS API 85 closes the communication channel all of the access rights to shared resources may be removed and any pending or future operations on the resources may be terminated. It should be pointed out that the calls or messages received by the OS API 85 may be generated by the interprocess engine 80.

Additionally, it should be pointed out that the OS API 85 may communicate with one or more operating systems. In this regard, the OS API 85 may communicate with different operating systems including but not limited to any OS that is fully or partially compatible with the Portable Operating System Interface for Unix (POSIX) standard, a Linux OS, a Unix OS, a Berkeley Software Distribution (BSD) OS, a Microsoft Windows OS, a Mac OS, or any other suitable operating system. In an exemplary embodiment the OS API 85 may be utilized to allow the processes of the exemplary embodiments to communicate with each other even though some or all of the processes may be executed in different operating systems. For example, software associated with the OS API 85 may be written in a manner that allows the OS API 85 to operate independently of a particular operating system.

The interprocess engine 80 of the apparatus 50 may be configured to open a local socket connection between one or more processes (e.g., process 83) and generating access rights to one or more resources that are owned or controlled by a process (e.g., process 83) and may send or pass on the access rights to the OS API 85 so that the resources may be shared with another processes (e.g., process 82). For instance, as described above, the access rights that are generated by the interprocess engine 80 may be received by the OS API 85 and the OS API 85 may assign the access rights to another process which allows the one or more resources to be shared between processes. Additionally, the interprocess engine 80 may remove previously granted access rights to a resource that were given to a process and terminate any pending or future operations on them. In this regard, the interprocess engine 80 may send or pass a request to the OS API 85 to terminate or deny access rights to a resource that is owned or controlled by a process and in this regard the OS API 85 may remove access rights to a resource(s) that was previously granted to a process. In this regard, when the access rights to resources given to a process are removed by the OS API 85, the access rights are terminated and any pending operations of these resources that are currently being used by this process are terminated. It should also be pointed out that the interprocess engine 80 may utilize one or more function calls to send the requests to allow access rights to one or more resources or to terminate the access rights to one or more resources which are received by the OS API 85 as described more fully below.

FIG. 3 illustrates an exemplary embodiment relating to sharing of access rights to a resource(s) by one or more processes via an interprocess communication. In the exemplary embodiment of FIG. 3 it should be pointed out that the processes 87, 88 and 89 may be maintained by a single device such as for example apparatus 50. Alternatively, each of the processes 87, 88 and 89 may be maintained by any one of the mobile terminal 10, second communication device 20 and the third communication device 25. Additionally, it should be pointed out that the communication channel 71 (also referred to herein as an authorized interprocess communication channel) is open and in this regard the processes 87, 88 and 89 may communicate with each other and with the OS API 85 via the communication channel 71. The resource(s) 81 may include but is not limited to one or more memories or memory objects, one or more files, one or more directories, one or more sockets or any other suitable resources. Process 87 may own or control one or more resources 81 as signified by the communication 77 of process 87 with resource(s) 81 and in this regard the interprocess engine 80, associated with the device (e.g., mobile terminal 10) maintaining process 87, may generate access rights to the resource(s) 81 which allow the processes 88 and 89 to share the resource(s) 81 with process 87.

In this regard, the interprocess engine 80 may send a request 78, via the communication channel 71, to the OS API 85 instructing the OS API 85 to allow the resource(s) 81 to be shared by processes 88 and 89. In this regard, the OS API 85 may assign access rights for resource(s) 81 to processes 88 and 89. The OS API 85 may notify the processes 88 and 89 that each process has access rights to share resource(s) 81 by sending communications 73 and 75 to processes 88 and 89, respectively. In this regard, processes 88 and 89 may be users of the resource(s) 81. Although not shown in FIG. 3, the interprocess engine 80 may also send a request to the OS API 85 to terminate the sharing of resource(s) 81 by processes 88 and 89 and in this regard the OS API 85 may remove the access rights to use resource(s) 81 which may terminate access to the resource(s) 81 with respect to processes 88 and 89. As such, if processes 88 and 89 are performing operations (e.g., read and/or write operations) requiring access to resource(s) 81 (e.g., a memory), these operations may fail. Additionally, in an alternative exemplary embodiment, it should be pointed out that when each of the processes 87, 88 and 89 are maintained by separate devices that the devices (e.g., second and third communication devices 20 and 25) maintaining processes 88 and 89 may be near-field communication devices which are capable of exchanging data with other devices (e.g., mobile terminal 10 which may maintain process 87) over a distance of about 10 meters, for example.

Referring now to FIG. 4, a signal flow for a mechanism of sharing a resource such as, for example, a memory or memory object via an interprocess communication according to an exemplary embodiment is provided. It should be pointed out that the memory described as the resource being shared in FIG. 4 is for purposes of illustration and not of limitation and in this regard the resource of FIG. 4 may include but is not limited to one or more files, one or more directories, one or more pipes (e.g., sockets), or any other local resources. According to this embodiment in step 1, the processes 1 and 2 (e.g., processes 83 and 82, respectively) may each open a local socket in order to communicate via an open interprocess communication channel (e.g., interprocess communication channel 71). It should be pointed out that each of the functions associated with processes 1 and 2 described with respect to FIG. 4 may be performed by an interprocess engine such as interprocess engine 80. In step 2, process 1 may determine that it desires to share one or more resources under its control such as a memory or memory object and in this regard process 1 may request OS API to generate a file descriptor (fd) for opening and creating a shared memory (shm) named "myregion". OS API may grant read and/or write (RDWR) access rights to the memory for process 1. This ensures that process 1 itself has required access rights for the opened resource before being able to pass them on to other processes. In step 3, process 1 may generate a call function which specifies the size of the shared memory named "myregion" and may send this call function to the OS API.

In step 4, process 1 may request OS API to map the "myregion" shared memory to the virtual memory of the process 1. The OS API may return a memory address (e.g., via "rptr" pointer) to the mapped shared memory. The access rights in this example are related to reading to the shared memory and/or writing to the shared memory. In step 5, process 1 may assign a descriptor to the interprocess communication channel which assigns the memory to the interprocess communication channel so that the memory may be passed along or shared with another process (e.g., process 2). At the same time, process 1 can define the access rights to the shared memory for process 2 (e.g., read-only, write-only or both read and write, e.g. "O_RDWR"), whether or not the access rights to the shared memory are bound to the lifetime of the interprocess communication connection (e.g., "bnd" Boolean) and whether or not the process 2 can forward access rights for the resource to another process (e.g., "fwd" Boolean). It should be pointed out that it is possible to grant access rights to more than one resource at the same time e.g. by providing an array of data structures, each containing all above information (descriptor, access rights, lifetime of the access rights, ability to pass access rights forward). Additionally, it should be pointed out that the access rights, the lifetime of the access rights and the ability to pass them forward to another process can be changed at any time (even though it normally requires some agreed protocol/behavior between processes regarding when such should happen) for example process 1 may change the access rights for the shared memory at any time it prefers.

In step 6, the OS API may assign the access rights for reading and writing to the memory "myregion" to the process 2 by using the interprocess communication channel. Before the assignment, the OS API may check that the requested access rights are those that the process 1 already has for the shared resource. In this regard, the OS API is a new API which may assign access rights for a resource(s) to one or more remote processes. In step 7, process 2 may request a file descriptor (fd) from OS API indicating or verifying that it has access to the shared memory "myregion" and specifying that it has read and/or write access rights. In step 8, the OS API may check to ensure that process 2 has the access rights to the memory named "myregion". Optionally, in step 9, if the OS API determines that process 2 has access rights to the memory, the OS API may generate a file descriptor containing data specifying that process 2 has rights to the memory and specifying that the memory was successfully opened. The OS API may send the file descriptor to process 2. The file descriptor may also provide a pointer to the memory and may indicate the size of the memory. It should be pointed out that if the OS API determines that process 2 does not have any access rights to the memory, the opening of the memory may fail and the OS API may send process 2 a file descriptor (not shown) indicating that process 2 does not have access rights to the memory. In step 10, process 2 may request the OS API to map the "myregion" shared memory to a virtual memory of process 2. The process 2 may also specify that it wants to have read and/or write access rights to the shared memory. In step 11, the OS API may allow both process 1 and process 2 to read and write to the shared memory depending on the granted access rights.

In step 12, process 2 may request OS API to unmap the shared memory from its virtual memory. In step 13, the process 2 may request OS API to release the shared memory (e.g., to stop sharing of the shared memory) by providing the file descriptor of the shared memory. In response to receipt of the close(fd) call, in step 14, process 1 may request the OS API to remove any access rights for the shared memory from the interprocess communication channel by providing the file descriptor of the shared memory. The actual way to know when process 2 has stopped sharing of the memory is not particularly relevant. For example, the sharing of the memory may be stopped when process 2 sends a message to process 1 via an interprocess communication channel indicating the end of usage. It should be pointed out that process 1 may remove access rights to the memory from the interprocess communication channel so that the memory may no longer be available for sharing without regard to receipt, by the OS API, of any call or message containing a file descriptor sent from process 2 indicating that process 2 wants to release or unlink the shared memory. For instance, process 1 may remove access rights to the shared memory at any given time. Additionally, it should be pointed out that process 1 may deny any request by process 2 to obtain access to the memory or any other resource that is controlled by process 1.

In response to receipt of the request to remove the shared memory from the interprocess communication channel, the OS API may remove the access rights relating to reading and writing the shared memory "myregion" from process 2, in step 15. In this regard, the OS API is a new API which may remove or unassign access rights for a resource(s) from one or more remote processes.

In step 16, process 1 may request the OS API to unmap the memory "myregion" from its virtual memory and may provide a pointer to the memory that is to be unmapped. In step 17, process 1 may request the OS API to unlink the memory that was shared with process 2. In this regard, all access rights relating to the memory that is controlled by process 1 are removed from process 2. In step 18, process 1 may request the OS API to release the shared memory. As such, any subsequent calls for access rights (e.g., read and/or write) to the memory by process 2 may fail and any operations associated with using the memory by process 2 may fail unless the process 2 has been given rights to pass the resource onwards (e.g. by the "fwd" Boolean).

Referring now to FIG. 5, a signal flow for sharing one or resources such as, for example, a file(s) via an interprocess communication according to an exemplary embodiment is provided. It should be pointed out that the file described as the resource being shared in FIG. 5 is for purposes of illustration and not of limitation and in this regard the resource of FIG. 5 may include but is not limited to a memory, memory object, one or more directories, one or more pipes (e.g., sockets), or any other local resources. According to this embodiment in step 1, the processes 1 and 2 (e.g., processes 83 and 82, respectively) may each open a local socket in order to communicate via an open interprocess communication channel (e.g., interprocess communication channel 71). It should be pointed out that each of the functions associated with processes 1 and 2 described with respect to FIG. 5 may be performed by an interprocess engine such as interprocess engine 80. In step 2, process 1 may determine that it desires to allow a file to be shared with one or more other processes. In this regard, process 1 may request OS API (e.g., OS API 85) to open a file, named "myfile", that process 1 owns or controls for specific access type (e.g., read, write or both read and write). If process 1 has appropriate access rights (e.g., read, write or both read and write) for the file the OS API may generate a file descriptor (fd) and return it to process 1. This ensures that the process 1 has appropriate access rights for the file before being able to pass any of them to another process. In step 3, process 1 may request OS API to assign specific access rights (e.g. O_RDWR for read and write access) for the file to be shared via the interprocess communication channel so that the file may be passed along or accessible to process 2 so that the file may be shared with those access rights. Also, process 1 may limit whether or not the passed access rights are bound to the lifetime of the open interprocess communication channel (e.g. by using "bnd" Boolean) and the process 2 may pass those access rights to another process (e.g. by using "fwd" Boolean). Additionally, it should be pointed out that the access rights, the lifetime of the access rights and the ability to pass them forward to another process can be changed at any time (even though it normally requires some agreed protocol/behavior between processes regarding when such should happen) for example process 1 may change the access rights for the file at any time it prefers.

In step 4, the OS API may assign access rights such as for example read and/or write access rights for the file named "myfile" to Process 2, which is a remote peer of the interprocess communication channel. In this regard, the OS API is a new API which may assign access rights for a resource(s) to one or more remote processes. In step 5, process 2 may request the OS API to open the file named "myfile" and requesting that the read and/or write access rights to the file be granted. In step 6, the OS API may perform a check to determine that process 2 has access rights to the requested file named "myfile". It should be pointed out that the OS API may perform the check because process 2 does not normally have access rights to the file. Optionally, in step 7, if the OS API determines that process 2 has the access rights to the file, the OS API may generate a file descriptor containing information indicating that process 2 has access rights and indicating that the opening of the file was successful. In this regard, the OS API may send this file descriptor to process 2. It should be pointed out that if the OS API determines that process 2 does not have any access rights to the file, the opening of the file may fail and the OS API may send process 2 an invalid file descriptor (e.g., "−1", not shown) indicating that process 2 does not have access rights to the file. In step 8, the OS API may allow process 2 to read and write to the file named "myfile" since the OS API determined that process 2 had access rights to the file. When process 2 no longer requires access to the shared file, process 2 may generate a close(fd) call to close the file or release the usage of the file and this close(fd) call may be sent to the OS API, in step 9. In response to receipt of the close(fd) call, process 1 may remove any access rights for the file from the interprocess communication channel so that the file may no longer be available for sharing, in step 10. The actual way to know when the process 2 has closed the file is not particularly relevant. For example, the file may be closed when process 2 sends a message to process 1 via interprocess communication channel indicating closing of the file. It should be pointed out that process 1 may remove any access rights for the file from the interprocess communication channel so that the file may no longer be available for sharing without regard to receipt of any call or message from process 2 indicating that process 2 no longer requires access to the shared file. For instance, process 1 may remove access rights to the shared file at any given time. Additionally, process 1 may deny any request by process 2 to obtain access to the file or any other resource that is controlled by process 1.

In step 11, the OS API may remove the read and/or write access rights to the file named "myfile" from the interprocess communication channel. This may remove all access to the file from process 2. As such, any subsequent calls for access rights (e.g., read and/or write) to the file by process 2 may fail and any operations associated with using the file by process 2 may fail. In this regard, the OS API is a new API which may remove or unassign access rights for a resource(s) from one or more remote processes. In step 12, process 1 may generate a close(fd) call to close access to the file.

It should be pointed out that FIGS. 4 and 5 are flowcharts of a system, method and computer program product according to exemplary embodiments of the invention. It will be understood that each block or step of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by one or more memory device of the mobile terminal or network device and executed by a processor in the mobile terminal or network device. In some embodiments, the computer program instructions comprising the computer program product(s) which embody the procedures described above may be stored by memory devices of a plurality of computing devices. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts. These computer program instructions may also be stored in a computer-readable memory that may direct a computer or other programmable apparatus to function in a particular manner, such that the instructions stored in the computer-readable memory produce an article of manufacture including instruction means which implement the function specified in the flowcharts. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention may include a computer-readable storage medium, such as the non-volatile storage medium, and computer-readable program code portions, such as a series of computer instructions, embodied in the computer-readable storage medium.

In an exemplary embodiment, an apparatus for performing the methods of FIGS. 4 and 5 above may comprise a processor (e.g., the processor 70) configured to perform some or each of the operations (1-17) associated with FIG. 4 and the operations (1-12) associated with FIG. 5 described above. The processor may, for example, be configured to perform the operations 1-17 (of FIG. 4) and 1-12 (of FIG. 5) by performing hardware implemented logical functions, executing stored instructions, or executing algorithms for performing each of the operations. Alternatively, the apparatus may comprise means for performing each of the operations described above. In this regard, according to an exemplary embodiment, examples of means for performing operations 1-17 (of FIG. 4) and 1-12 (of FIG. 5) may comprise, for example, the processor 70, the interprocess engine 80, the OS API 85 and/or a device or circuit for executing instructions or executing an algorithm for processing information as described above.

As such, then, some embodiments of the invention provide several advantages to computing devices, computing device users and network operators. For example, embodiments of the invention may provide a mechanism for sharing resources between interconnected processes in a secure and flexible manner. Additionally, the example embodiments allow access rights to shared resources of processes to be removed or terminated at any given time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a request from at least one first process that controls one or more resources, the request comprises data requesting assignment of one or more rights to share at least one of the resources with at least a second process;
   assigning, via a processor, the rights to share the resource with the second process; and
   removing the rights to share the resource from the second process upon receipt of a first message.

2. The method of claim 1, wherein the first message comprises information indicating that use of the resource is no longer required by the second process or content specifying that the first process requests removal of the rights to share the resource with the second process.

3. The method of claim 1, wherein prior to receiving the request, the method further comprises:
   receiving an indication that the resource was opened and assigned to a communication channel for sharing with the second process.

4. The method of claim 1, wherein prior to removing the rights, the method further comprises:
   determining whether the second process initially has the rights to share the resource; and
   performing a check to determine whether the rights were properly assigned to the second process in an instance in which the determination reveals that the second process does not initially have the rights.

5. The method of claim 4, further comprising, allowing the second process to share the resource with the first process based at least in part on the results of the check.

6. The method of claim 4, further comprising:
   generating a second message comprising data specifying that no access rights are granted to the second process and indicating that sharing of the resource is not allowed in an instance in which the check reveals that the rights were not properly assigned to the second process; and
   enabling sending of the second message to the second process.

7. The method of claim 1, wherein removing comprises removing the rights to share the resources on the basis of receipt of a second message generated by the first process, the second message comprises information requesting removal of the rights to share the resource from a communication channel.

8. The method of claim 7, wherein removing the rights from the communication channel comprises terminating the usage of the resource by the second process and causing any operations associated with usage of the resource by the second process to fail.

9. An apparatus comprising:
   at least one processor; and
   at least one memory including computer program code, the at least one memory and the computer program code configured to, with the at least one processor, cause the apparatus to perform at least the following:
   receive a request from at least one first process that controls one or more resources, the request comprises data requesting assignment of one or more rights to share at least one of the resources with at least a second process;
   assign the rights to share the resource with the second process; and
   remove the rights to share the resource from the second process upon receipt of a first message.

10. The apparatus of claim 9, wherein the first message comprises information indicating that use of the resource is no longer required by the second process or content specifying that the first process requests removal of the rights to share the resource with the second process.

11. The apparatus of claim 9, wherein the memory and the computer program code are further configured to, with the processor, cause the apparatus to:

receive an indication that the resource was opened and assigned to a communication channel for sharing with the second process prior to receiving the request.

12. The apparatus of claim 9, wherein in response to the assign of the rights, the memory and the computer program code are further configured to, with the processor, cause the apparatus to:

determine whether the second process initially has the rights to share the resource; and perform a check to determine whether the rights were properly assigned to the second process in an instance in which the determination reveals that the second process does not initially have the rights.

13. The apparatus of claim 12, wherein the memory and the computer program code are further configured to, with the processor, cause the apparatus to:

allow the second process to share the resource with the first process based at least in part on the results of the check.

14. The apparatus of claim 12, wherein the memory and the computer program code are further configured to, with the processor, cause the apparatus to:

generate a second message comprising data specifying that no access rights are granted to the second process and indicating that sharing of the resource is not allowed in an instance in which the check reveals that the rights were not properly assigned to the second process; and enable sending of the second message to the second process.

15. The apparatus of claim 9, wherein the memory and the computer program code are further configured to, with the processor, cause the apparatus to:

remove the rights by removing the rights to share the resources on the basis of receipt of a second message generated by the first process, the second message comprises information requesting removal of the rights to share the resource from a communication channel.

16. The apparatus of claim 15, wherein the memory and the computer program code are further configured to, with the processor, cause the apparatus to:

remove the rights from the communication channel by terminating the usage of the resource by the second process and causing any operations associated with usage of the resource by the second process to fail.

17. A computer program product comprising at least one non-transitory computer-readable storage medium having computer-executable program code instructions stored therein, the computer-executable program code instructions comprising:

program code instructions configured to cause receipt of a request from at least one first process that controls one or more resources, the request comprises data requesting assignment of one or more rights to share at least one of the resources with at least a second process;

program code instructions configured to assign the rights to share the resource with the second process; and program code instructions configured to remove the rights to share the resource from the second process upon receipt of a first message.

18. The computer program product of claim 17, wherein the first message comprises information indicating that use of the resource is no longer required by the second process or content specifying that the first process requests removal of the rights to share the resource with the second process.

19. The computer program product of claim 17, wherein prior to cause receipt of the request, the computer program product further comprises:

program code instructions configured to cause receipt of an indication that the resource was opened and assigned to a communication channel for sharing with the second process.

20. The computer program product of claim 17, wherein prior to remove, the computer program product further comprises:

program code instructions configured to determine whether the second process initially has the rights to share the resource; and program code instructions configured to perform a check to determine whether the rights were properly assigned to the second process in an instance in which the determination reveals that the second process does not initially have the rights.

\* \* \* \* \*